INVENTOR
WAYNE G. ATWATER
BY
Baldwin, Doran & Egan
ATTORNEYS

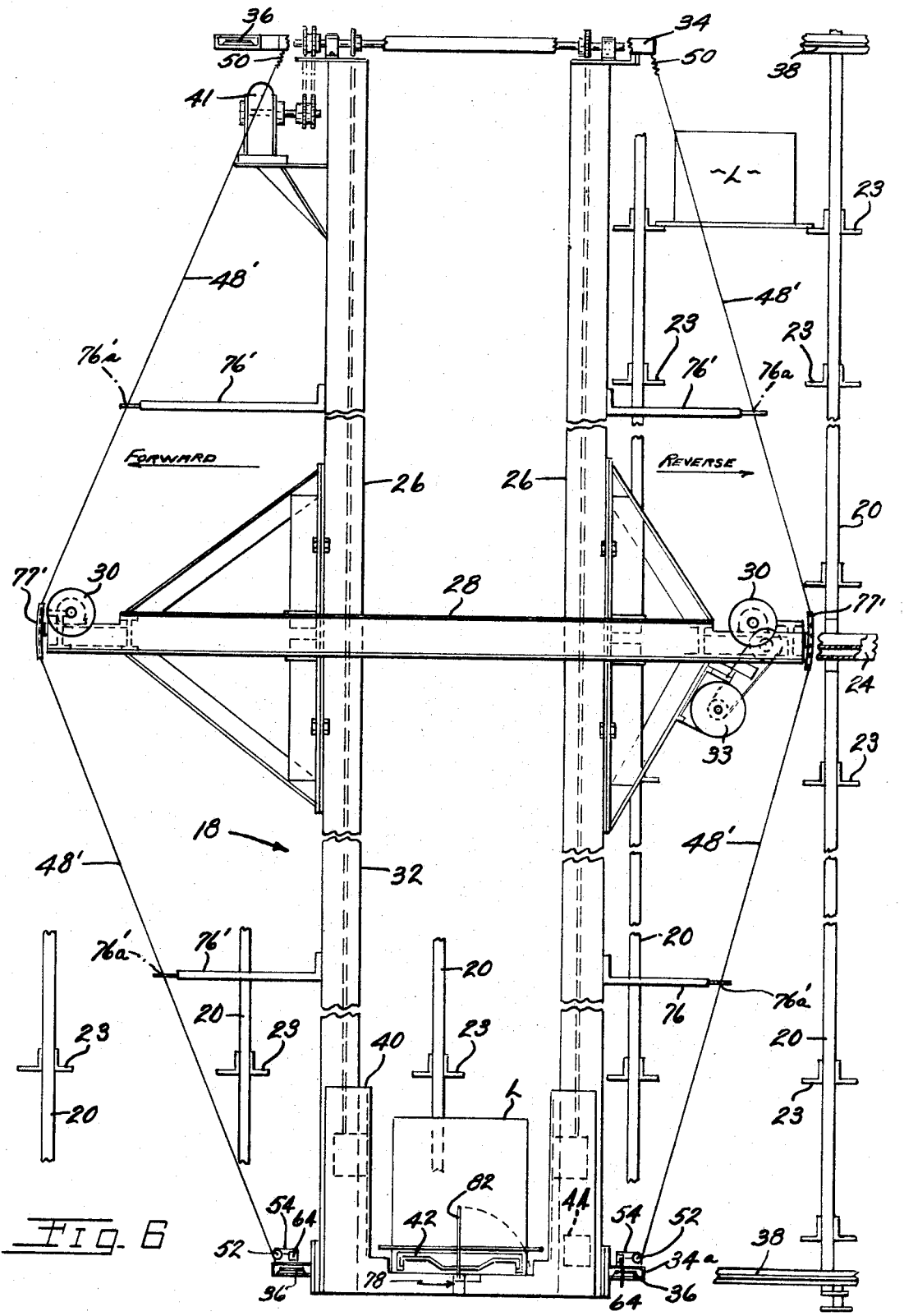

United States Patent Office 3,393,814
Patented July 23, 1968

3,393,814
DETECTING DEVICE FOR IMPROPERLY POSITIONED LOADS IN MULTI-LEVEL STORAGE FRAME OF A WAREHOUSING SYSTEM
Wayne G. Atwater, Willoughby, Ohio, assignor to The Triax Company, Cleveland, Ohio, a corporation of Ohio
Filed Apr. 1, 1966, Ser. No. 539,515
17 Claims. (Cl. 214—16.4)

This invention relates in general to automatic warehousing systems and the like for storing and unstoring loads, by transferring them between a movable load carrier and a storage frame, and more particularly relates to safety apparatus or load detecting mechanism for detecting skewed or otherwise disarranged loads in the warehousing system, and stopping the transferring motion of the load carrier, in the event of an improperly positioned load, to thereby prevent collision damage between the load carrier and the improperly positioned load, and/ or between the load and the storage frame.

It has been found that faster and faster speeds for operation of the load carrier mechanism are being requested by users of automatic warehousing systems, and this makes the problem of sensing obstructions and out of position loads more difficult. Load carrier speeds of, for instance, 300 feet per minute are now being requested for automatic warehousing systems. Prior speeds have generally been in the range of 90 to 120 feet per minute maximum. Collision between a load carrier operating at high speed and an improperly positioned load in, for instance, the storage frame, results in severe damage to the load carrier, and/or to the load, and/or to the storage frame. This is especially true as the speeds at which the load carrier operates, increase.

A warehousing system of the general type to which the present invention may be applied but by no means the only type, is disclosed in assignee's copending U.S. patent application, Ser. No. 484,845, filed Sept. 3, 1965, now Patent No. 3,371,804, under the name of Anthony R. Chasar, and entiled Automatic Warehousing System. The system in such patent application comprises a storage frame having vertically and horizontally arranged load-support means opening at a generally vertical work face, and disposed along a travel zone or aisle. An automatically controlled, mechanized load carrier is movable along the travel zone with a running clearance between the load carrier and storage frame, with such load carrier comprising an elevator for transporting a load to different levels in the storage frame. The elevator in turn carries a laterally extensible extractor for inserting loads into the storage frame and returning loads therefrom.

The present invention provides a novel detecting device or mechanism which is adapted for mounting on the load carrier of an automatic warehousing system, and which includes flexible or movable sensing means extending for substantially the full height of the associated storage frame and adapted for sensing improperly positioned loads in the storage frame during horizontal movement of the load carrier in the travel zone alongside of said storage frame, and which sensing means is so arranged that it will sweep the full work face of the storage frame generally in advance of the load carrier, with there being control means operatively coupled to the sensing means to deenergize the load carrier upon engagement between the sensing means and an improperly positioned load, to thus stop all further movement of the load carrier.

The present invention also provides an arrangement of the above described type in conjunction with a load detecting means of the type comprising an elongated feeler member adapted for pivotal mounting on the discharge side of the elevator of the load carrier, with means for pivoting the feeler, whereby the feeler may sweep through the running clearance between the load carrier and the storage frame to detect out of position loads projecting therein, to thus provide a combined load detecting arrangement for automatic warehousing systems.

Accordingly, an object of the invention is to provide a novel load detecting arrangement for mounting on the load carrier of an automatic warehousing system, for expeditiously sensing out of position loads or other obstructions in the storage frame of the system.

Another object of the invention is to provide a novel detecting means for use with an automatic warehousing system which includes multi-level storage means with a powered load carrier movable in a travel zone alongside of the storage means for inserting a load into or removing a load from any selected level of the storage means, and wherein such detecting means is operable to detect improperly positioned loads in the storage means and to stop further movement of the load carrier and thus prevent collision damage between any such improperly positioned load and the load carrier and/or the storage means, with such detecting means being suitably effective during relatively high speeds of load carrier movement.

A further object of the invention is to provide a load detecting mechanism of the above discussed type wherein such mechanism comprises elongated flexible elements mounted on the load carrier and extending generally vertically with respect to the load carrier for substantially the full height of the latter, and oriented for movement with the load carrier in the running clearance between the load carrier and the storage frame, and with such flexible elements being operatively coupled to control means which control means is operative to deenergize the load carrier upon deflecting engagement to one or more of the flexible elements with an improperly load or other obstruction in the storage frame.

A further object of the invention is to provide a detecting device of the discussed type in combination with a pivotal feeler type of detecting device which is mounted on the elevator of the load carrier, and which feeler type of detecting device is adapted to sweep through the running clearance between the elevator and the storage frame for sensing an improperly positioned load projecting out of the storage frame or out of the elevator, after it has been deposited or picked up, and for stopping all further movement of the load carrier upon detection of an improperly positioned load by said feeler.

A still further object of the invention is to provide a load detecting device for use in an automatic warehousing system which is operable to detect out of position loads in the storage frame of the system at relatively high speeds of movement of the load carrier of the system, and to stop the load carrier before damage to the system and/ or the load can occur, and which is instantaneously operative for the full height of the storage frame.

Other objects and advantages of the invention will be apparent from the following description taken in conjunction with the accompanying drawings wherein:

FIGURE 6 is a fragmentary, broken, side elevational view of the load carrier utilizing a modified form of elongated flexible detecting device.

Figure 1:
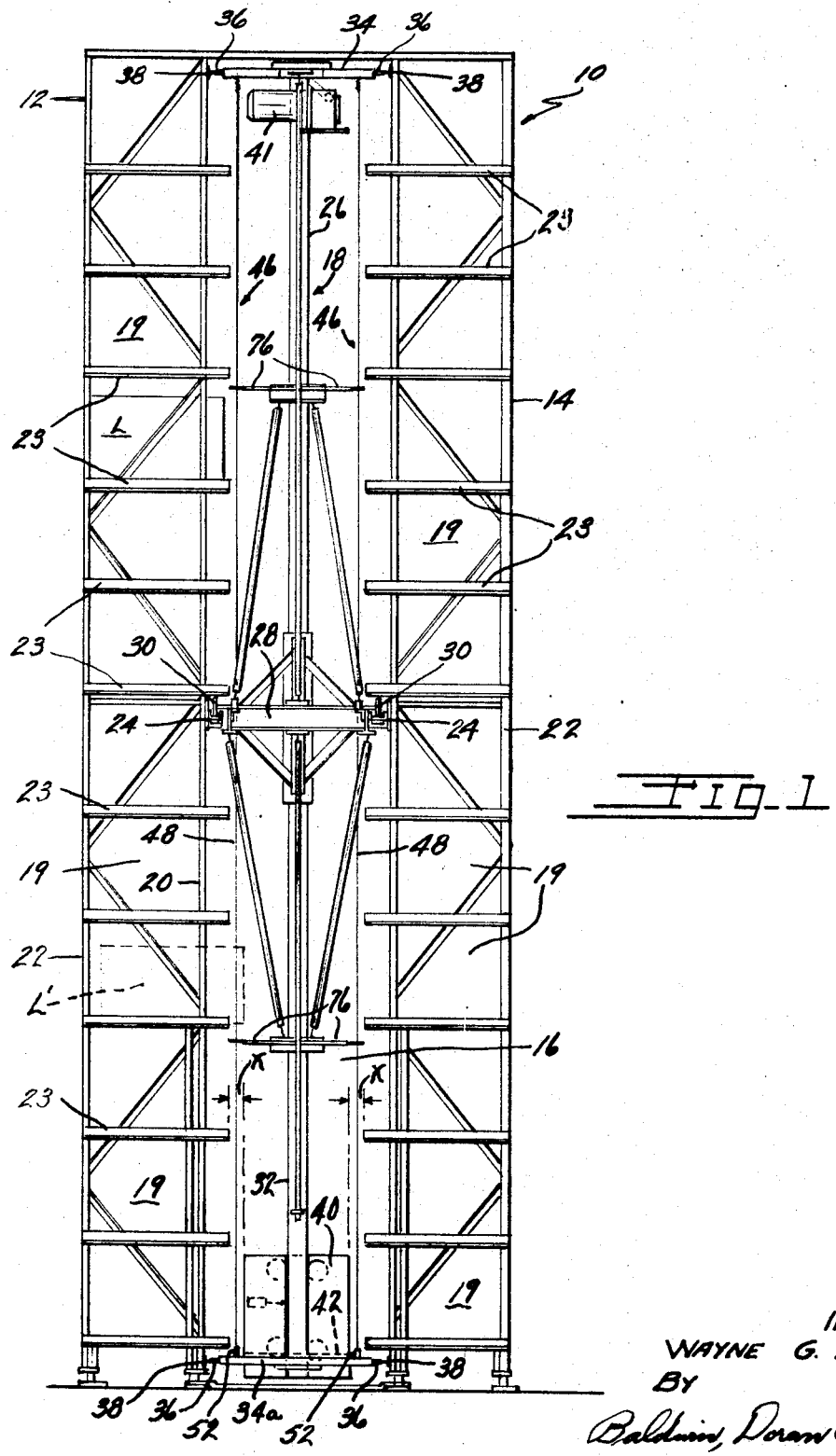
FIGURE 1 is an end view of a storage frame comprising a plurality of tiered bins, and showing a load carrier associated therewith, with the load carrier having mounted thereon load detecting means in accordance with the invention.

Referring now again to the drawings, the automatic warehousing system, in the embodiment illustrated, comprises a storage frame 10 having generally parallel storage bay sections 12 and 14, defining between them a travel zone or aisle 16, so as to permit the motorized load carrier indicated generally at 18, to be moved along the aisle or travel zone and to insert and/or withdraw a load or article from the storage bins 19 formed by the storage sections 12 and 14.

As shown, each storage bay may be constructed of a plurality of vertically extending posts 20, 22, spaced apart by a plurality of generally horizontally extending load supporting rails or members 23, which at their aisle or inner ends extend inwardly toward the aisle, and define a plurality of the storage bins 19. As aforementioned, the instant arrangement of warehousing system may be generally similar to that disclosed in copending U.S. patent application Ser. No. 484,845, and reference may be had thereto for more detailed description of such multi-level storage bin arrangement.

The aisle sides of the storage sections 12, 14 may be provided with a pair of generally horizontally extending rails 24 defining tracks providing for supporting the load carrier 18 as it is moved therealong within the aisle or travel zone 16, with there being provided a relatively small running clearance X (FIG. 1) between the sides of the load carrier and the confronting sides of the storage sections during movement of the load carrier in said travel zone.

Load carrier 18 may comprise an upright mast structure formed with a pair of generally vertically extending track members 26 with the mast structure being secured to an intermediate generally rectangular carriage frame 28. Carriage frame 28 bridges the distance across aisle 16 and may have wheels 30 at the sides thereof which are disposed in rolling engagement in the tracks 24, thus supporting the load carrier 18 on the tracks for horizontal movement. Such horizontally movable structure of the load carrier will be hereinafter referred to as conveyor mechanism or means 32. Suitable power means 33 (FIG. 2) such as an electric motor, may be operably coupled to wheels 30 for causing horizontal movement of the conevyor means 32 with respect to the storage sections 12 and 14.

The upper and lower ends of the conveyor means 32 may be provided with generally rectangular frames 34, 34a respectively, and with generally horizontally rotatable pulleys or rollers 36 mounted thereon adapted for engagement with generally T-shaped (in the embodiment illustrated) rails 38 mounted on the aisle side of each storage section, thereby guiding the upper and lower ends of the load carrier as it is moved along the aisle 16, and providing in conjunction with carriage frame 28 three point stabilizing engagement between the load carrier and the storage frame.

Rails 24 and 38 preferably extend outwardly of the aisle 16 at the front end of the aisle, to enable the load carrier to be located in front of the storage sections 12 and 14 at a pickup and discharge station, from which position the load carrier starts its movement into the aisle to deposit or pick up loads in the storage frame sections. Reference may be had to aforementioned U.S. patent application 484,845 for a detailed disclosure of such a pickup and discharge station.

Load carrier 18 may comprise a vertically movable elevator 40 which is adapted for vertical movement along the tracks 26 of the mast structure to the full height of the storage frame. Elevator 40 moves through an opening in the carriage frame 28 as the elevator moves to the upper sections of the storage frame above the carriage frame 28 and thus is unimpeded in its vertical movement. Suitable power means such as an electric motor 41 may be carried by the mast structure of the horizontally movable conveyor means 32, with such motor being operably coupled to the elevator 40 in a known manner for actuating the elevator in its vertical movement.

The elevator 40 may include a load supporting platform or extractor 42 (FIGURE 2) which preferably provides an extensible table, such table being extendible in either of the opposed directions transverse to the direction of movement of the load carrier in its travelling zone, so as to locate the table within either of the storage sections 12 or 14, effective to place the extensible table in position to deposit or remove a load from a selected one of the storage bins 19. Suitable power means such as an electric motor 44 operably coupled to the extractor, may be provided for actuating the latter. Reference may be had to the aforementioned copending U.S. application Ser. No. 484,845 for a more detailed disclosure of such extensible extractor.

In accordance with the present invention, there is provided detecting means 46 on the load carrier, which is operable to detect an improperly positioned load in the storage frame sections and to stop all further movement of the load carrier. Such detecting means comprises elongated generally flexible sensing elements or members 48 extending for substantially the full height of the conveyor 32 to thus extend for substantially the full height of the associated storage bays. Two of such sensing elements 48 may be mounted on each side of the load carrier, with the sensing elements on such side being disposed forwardly and rearwardly of the mast structure 26 and within the confines of the running clearance X on the respective side. Such elongated sensing elements may comprise for instance steel cables, which may be resiliently mounted at one end thereof, and as by means of an extension spring 50, to the upper frame 34 of the horizontally movable conveyor 32. The lower end of each element 48 may be secured to a rotatable member such as pulley 52, rotatably mounted on a bracket member 54 which in turn may be secured to the lower stabilizing frame 34a of the load carrier. The elongated elements are preferably disposed in generally taut condition and extend in a substantially vertical plane on the respective side of the load carrier.

Each pulley member 52 may be rotatably mounted upon a shouldered nut 56 having a smooth shank portion 56a for rotatably receiving the pulley wheel, with the nut being suitably fastened to the bracket 54 as by means of threaded portion 56b. The outer side of the pulley wheel may carry a circular (in the embodiment illustrated) cam 58, the axis of which is radially displaced from the axis of the pulley wheel, with such cam being adapted to travel in an arc around the axis of the pulley wheel whenever the pulley wheel is rotated. In its normal position, the cam is disposed substantially exactly opposite roller 60 on spring loaded, plunger type limit switch actuator 62, and when in such position, contacts the roller and cams the actuator 62 inwardly.

Figure 3:
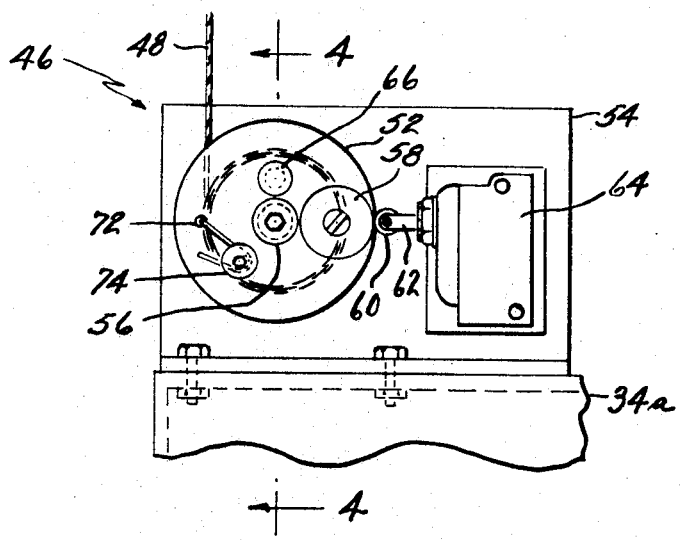
FIGURE 3 is an enlarged elevational view illustrating a rotatable pulley member coupled to one of the elongated sensing elements of the detecting device and coacting with a conrtol means comprising a switch, and wherein such switch is adapted for controlling the deenergization of the load carrier upon engagement of the detecting means with an improperly positioned load.
Figure 4:
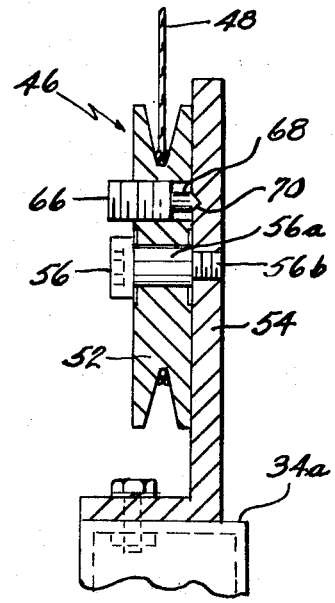
FIGURE 4 is a sectional view taken generally along the plane of line 4—4 of FIGURE 3 looking in the direction of the arrows.

When the actuator is in the position illustrated in FIGURE 3, the contacts of the conventional plunger type limit switch 64 are held in a position to permit the load carrier 18 to operate normally, and in other words to move in the travel zone between the storage bays or sections 12 and 14. Rotation of the cam 58 around the axis of rotation of the pulley during rotation of the pulley and away from the roller 60, permits the spring loaded actuator 62 to move outwardly, whereby the limit switch contacts move to cutoff position, thereby stopping movement of the carrier.

In this connection, the movement of the conveyor frame 32, and the movement of the elevator 40 and extractor 42 thereof, as actuated by the power means 33, 41 and 44, are all preferably automatically actuated in a predetermined series of simultaneous or sequential movements, to store and/or retrieve a load, and as by means of an automatic control system of the type disclosed in the copending U.S. patent application of Sanford Saul, filed Dec. 14, 1964 under Ser. No. 418,048, and entitled Electrical Control Circuit for an Automatic Warehousing System. The limit switches 64 may be connected into such a control circuit in conventional manner, well known to those skilled in the electrical control art, to break the circuit in a main power lead or isolate a master control relay, to cut off the power to motor units 33, 41 and 44 and thus stop all movement of the load carrier. As disclosed in the above patent application, the motors powering the load carrier have electro-responsive braking means associated therewith to prevent over-running of the motors upon deenergization thereof, and in the conventional manner. A detent mechanism 66 may be mounted on the pulley wheel so as to releasably hold the pulley wheel in the position illustrated in FIG. 3. Such detent mechanism may comprise a threaded cartridge threaded into an aperture extending through the pulley, and carrying a spring biased detent 68. The detent 68 is directed toward the confronting surface of bracket 54, and said surface may be provided with a relatively shallow recess 70, adapted to receive the distal end of the detent 68. The recess 70 is so positioned that the detent is seated therein when the pulley and cam are in the position shown in FIG. 3, and such detent and recess create sufficient resistance to the turning of the pulley wheel, so that any tendency of the cam 58 to independently roll away from the roller 60 of the associated limit switch 64 is prevented. In this position, the associated flexible member or cable 48 is pulled generally tautly, with the lower end thereof being looped about the pulley, preferably two or three times, and then projecting through an aperture 72 in the outer side of the pulley to be secured to the pulley, as by means of headed screw 74.

Figure 2:
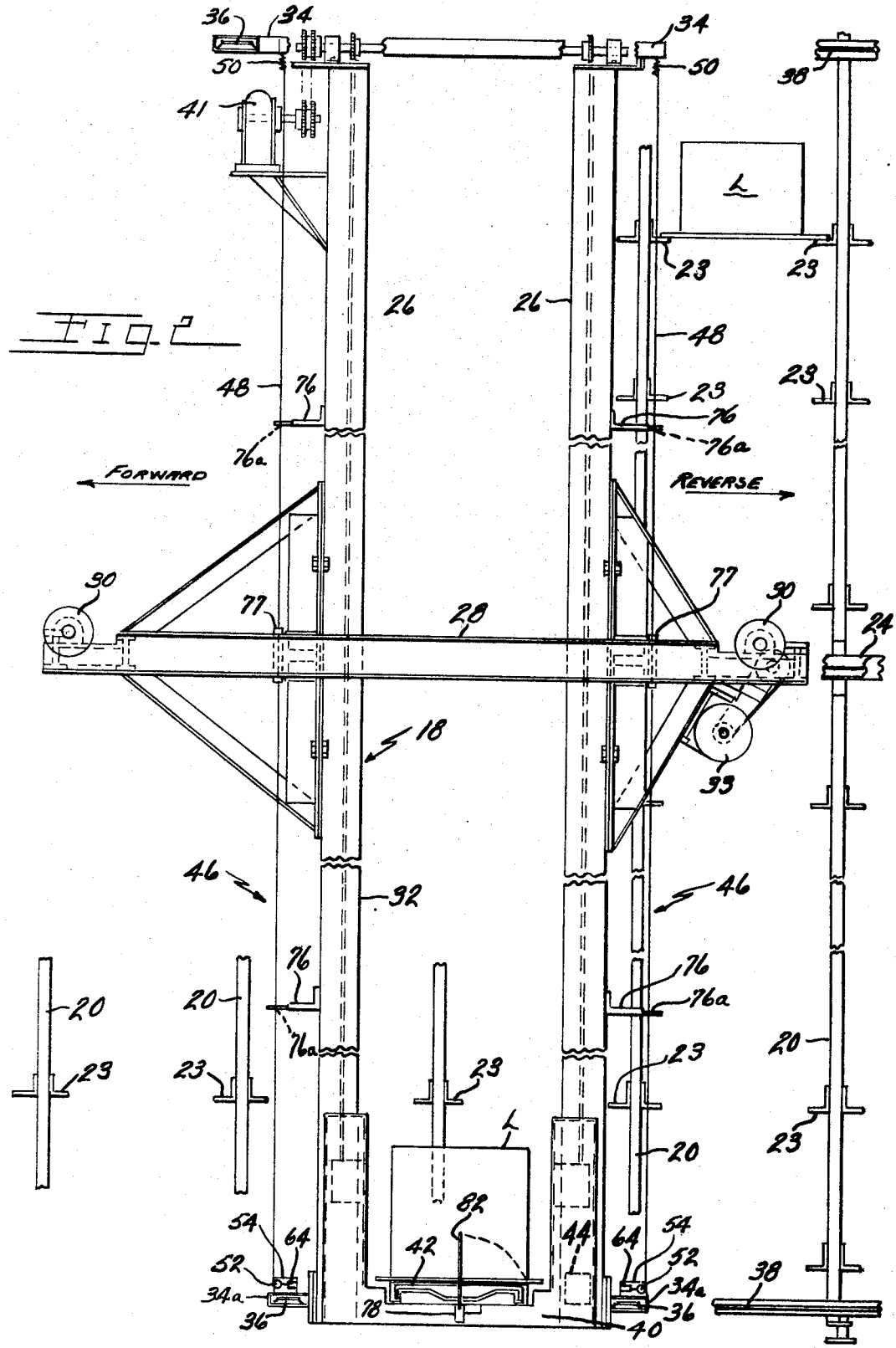
FIGURE 2 is a fragmentary, broken, side elevational view of the load carrier and associated detecting device.

As best shown in FIGS. 1 and 2 there is preferably provided guide means 76, 77 on the load carrier which are adapted for guiding the elongated sensing means 48 in their vertically extending positions. Guide means 76 may comprise arms extending outwardly from the respective track 26 of the mast structure, and having an opening 76a therein of sufficient size to permit predetermined movement or flexure of the associated sensing element without engaging the guide means. Guide means 76 are preferably provided both above and below the carriage frame 28, and substantially midway between the carriage frame 28 and the respective upper and lower ends of the load carrier structure 18, as best shown in FIG. 1. The guide means 76 are preferably arranged on mast structure 26 so that they project toward the associated storage frame in the vicinity of the normal clearance between the load in one storage bin and the underside of the next upwardly disposed storage bin, and thus will normally be in non-interfering relation with stored loads even if the latter are in improperly stored condition in the storage frame.

The guide means 77 preferably comprise elongated tubular members of sufficient internal diameter to permit a predetermined amount of unrestricted flexure of the elongated sensing elements 48. Such elongated tubular members may be suitably secured to the carriage frame 28 and in non-interfering relationship with the elevator 40 as the latter passes through the carriage frame to the upper portions of the storage sections 12 and 14.

Figure 5:
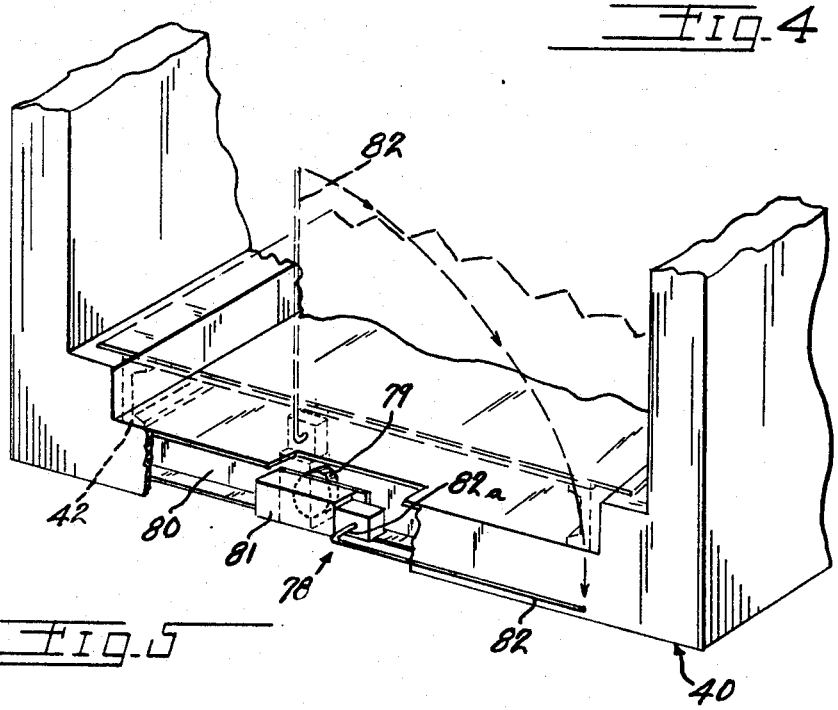
FIGURE 5 is a perspective view of a portion of the elevator of the load carrier showing a pivotal feeler type detecting device associated therewith for use in combination with the elongated flexible detecting device of FIGS. 1–4.

Referring now to FIG. 5, there is shown a pivotal feeler type detecting device generally referred to by reference number 78, one of which is preferably mounted on both sides of the elevator 40 adjacent the aisle ends of the load supporting rails 23 of the associated storage frame.

Detecting device 78 may be mounted below the laterally movable extractor 42, whereby the extractor can move out of the aisle into the storage frame in either transverse direction above the detecting devices. Such detecting device preferably comprises a self-setting rotary solenoid 79 secured to horizontal frame member 80 of the elevator, which rotary solenoid employs the inclined plane principle to covert linear motion to rotary motion. Solenoid 79 may be rotatable through approximately 90°–95° upon energization of its coil, and is provided with spring means causing automatic counter rotation thereof, when its coil is deenergized. The solenoid 79 carries a lever type limit switch 81 of conventional type, which limit switch has an operating member in the form of an elongated rod-like feeler 82 connected to the conventional actuator of the limit switch. Feeler 82 is adapted for pivoting as at 82a about an axis extending in a direction parallel with the direction of extractor movement, and transverse to the direction of the storage frame aisle. The limit switch 81 coupled to rotary solenoid 79 is also pivotal about an axis disposed parallel with the direction of extractor movement and transverse to the direction of the aisle, and from the full line position illustrated in FIG. 5 to the dotted line position. Pivotal movement of switch 81 causes the feeler 82 which normally lies generally horizontally below the extractor 42, to sweep upwardly and to approximately an upright position, in a plane which is parallel with the inner load receiving face of the storage frame defined by the ends of the load supporting members 23.

It will be readily understood that if, when the extractor 42 is centered on the elevator, the rotary solenoid 79 is energized, the feeler 82 will sweep through the running clearance X at the side of the elevator and will strike any load or obstacle which is projecting into the running clearance, either from the confronting storage bin of the storage frame or the elevator. If no obstacle is encountered, the limit switch 81 is not actuated and upon deenergization of the rotary solenoid, the solenoid automatically returns the switch and feeler to horizontal or the full line position shown in FIG. 5. If, however, an obstacle is encountered by the feeler 82, the latter will be caused to pivot about axis 82a during pivoting of the limit switch, thereby actuating the contacts of the switch. The limit switch is a normally closed switch and is connected into the control system of the automatic warehousing system so that upon actuation thereof as above described, no further movement of the load carrier-elevator-extractor mechanism is possible. The detecting devices on opposite sides of the elevator are preferably actuated simultaneously for sweeping both sides of the elevator. Reference may be had to assignee's copending U.S. patent application, Ser. No. 521,895, filed Jan. 20, 1966 in the name of Wayne G. Atwater and entitled "Detecting Device for Improperly Positioned Loads in an Automatic Warehousing System" for a more complete disclosure of such a pivotal feeler type detecting device and the controls thereof, for sweeping the running clearance on either side of an elevator in an automatic warehousing system.

The pivotal feeler type detecting device 78 is adapted to be operative immediately after the load carrier either deposits or picks up a load from the storage frame, with the extractor returning laterally back into the elevator and centering itself therein. It is at this point in the load handling cycle that the feeler device 78 comes into play, or is actuated, whereby brief sweeping motion is made with the feeler to determine whether or not a load is projecting improperly out of the storage frame, or out of the elevator.

It will be understood that if an improperly positioned load in the storage frame is extending out beyond the outer ends of the load supporting rails 23 and into the running clearance, as the load carrier moves in the travel zone (and as is illustrated by the reference letter L' in FIG. 1) such improperly positioned load if it strikes one of the sensing cables on the load carrier, will cause the cable to be deflected or moved, thereby causing rotation of the associated pulley wheel 52 against the resistance of the spring loaded detent 68, thus permitting the actuator 62 of the respective limit switch 64 to move outwardly. Outward movement of the actuator actuates the switch contacts to cut off power to the load carrier motors, and stops any further movement of the load carrier. Accordingly, damage to the load and/or to the load carrier and/or to the storage frame is prevented. Each of the aforesaid spring means 50 preferably possesses a greater resistance to extension than the resistance afforded by the detent mechanism 66 on the associated pulley 52, so that engagement by the flexible sensing element 48 with an improperly positioned load will cause rotary movement of the pulley and tripping of the associated switch 64 before extension of the spring 50 occurs.

Since the flexible elements extend for substantially the full height of the load carrier, the full work faces of the confronting storage frame sections are swept by the load carrier as it moves in the travel zone, and any out of position load extending into the running clearance is operative to deenergize the load carrier. By providing the pivotal feeler device in conjunction with the elongated flexible detecting means, it will be seen that a load which has been just positioned into or removed from the storage frame is immediately checked to make sure that it does not project into the running clearance before further movement of the load carrier occurs in the travel zone. Thus a complete detecting arrangement is provided for detecting improperly positioned loads in the warehousing system.

Referring now to the embodiment illustrated in FIG-URE 6, the flexible sensing means 48' of such modification, instead of extending substantially vertically as in the first described embodiment, extend in an outwardly divergent manner commencing at the upper ends thereof and downwardly to a location generally intermediate the upper and lower extremities of the conveyor frame 32, and preferably forwardly and rearwardly of the carriage 28. The flexible sensing means then pass through guide means 77' located generally adjacent the respective corner of the carriage frame 28 and from such guide means 77' converge inwardly in a downward direction to be coupled to a respective rotatable pulley 52 mounted on lower stabilizing frame 34a in a similar manner as the first described embodiment. A switch 64 coacts with the respective pulley 52 to control movement of the load carrier in the same manner as the first described embodiment.

The guide means 77' in such modified arrangement may comprise arcuate shaped tubular members through which the flexible cables pass and are supported in the tubular members in relatively sliding relationship, so that when one of the flexible members 48' engages a protruding load in the storage frame, the cable will readily slide relative to said guide means and cause rotation of the associated pulley 52 and thus actuation of the associated switch 64.

The flexible members 48' are preferably coupled at one end thereof to the load carrier by resilient means 50, and have intermediate guide means 76' projecting out from the mast structure in a generally similar arrangement as the first described embodiment. It will be understood that a pair of the flexible sensing members and their associated pulley and control switch mechanisms are preferably provided on both sides of the load carrier to sweep the running clearance on both sides thereof as the load carrier moves in the travel zone intermediate storage sections 12 and 14.

Operation of the detecting device of FIG. 6 is generally similar to the first described embodiment and it will be seen that sensing of improperly positioned loads is accomplished generally faster by the FIG. 6 embodiment as compared to the first embodiment, due to the orientation of the flexible sensing means 48' more closely adjacent the forward and rearward ends of the carriage 28.

Running clearance X as used in the aforegoing specification and hereinafter set forth claims will be understood to mean the clearance provided in the warehousing system between the plane of the aisle side of the storage frame and the confronting side of the load-carrier-elevator-extractor mechanism 18. The running clearance does not include the sensing mechanism 78, nor the sensing means 48, 48' and/or their supporting and guiding structure, which are deformable and/or expendable if struck by an object.

From the foregoing discussion and accompanying drawings it will be seen that the invention provides a novel detecting device for use with an automatic warehousing system, and comprising elongated flexible sensing means mounted on the load carrier and extending in the running clearance between the load carrier and the storage frame for substantially the full height of the storage frame, and with control means coacting between the flexible sensing means and power means driving the load carrier, for deenergizing such power means upon actuating engagement between the flexible sensing means and an improperly positioned load in the storage frame, thus stopping all further movement of the load carrier. The invention also provides a pivotal feeler type detecting means in conjunction with the aforesaid elongated flexible detecting means for giving complete sensing protection to the load carrier in its operational movements for depositing a load into or retrieving a load from the storage frame.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In an automatic warehousing system comprising a plurality of load storage means disposed in a tiered arrangement in at least one storage bay, said system including a powered load carrier movable in a travel zone alongside said bay with there being a running clearance between said load carrier and said bay, the combination therewith of detecting means for sensing an improperly positioned load extending from said storage bay into said running clearance, said detecting means comprising elongated generally movable flexible sensing means mounted on said load carrier and extending in said running clearance substantially the full height of said storage bay, said sensing means being operable to sense an improperly positioned load in said storage bay and to deenergize said load carrier to prevent its further movement, said detecting means including further sensing means mounted on said load carrier and operable immediately after removal or depositing a load in a selected storage means to check the position of the load and to deenergize said load carrier upon engagement of said further sensing means by an improperly positioned load.

2. A warehousing system in accordance with claim 1 wherein said load carrier is of approximately the same height as the height of said storage bay, and said flexible sensing means extends for substantially the full height of said load carrier.

3. A warehousing system in accordance with claim 1 wherein said detecting means includes control means operatively coupled to said flexible sensing means and to power means for driving said load carrier, said control means being operative to deenergize said power means upon predetermined movement of said flexible means.

4. A warehousing system in accordance with claim 1 including means on said storage bay supporting said load carrier for generally horizontal movement in said travel zone, the last mentioned means being disposed intermediate the upper and lower ends of said load carrier, said flexible sensing means comprising elongated generally flexible elements movably mounted in spaced relation with respect to said last mentioned means and being disposed in a plane extending generally perpendicularly to the plane of said last mentioned means.

5. A warehousing system in accordance with claim 3 wherein said flexible sensing means comprises an elongated generally flexible element disposed in generally taut condition, said control means including a switch operably coupled to said flexible element and to said power means, said switch being operative to deenergize said power means upon predetermined deflection of said flexible element.

6. A warehousing system in accordance with claim 1 wherein said load carrier comprises conveyor means movable generally horizontally in said travel zone along said bay, elevator means movable generally vertically on said conveyor means along said bay, and load supporting extractor means on said elevator means movable generally transversely of said travel zone across said running clearance for selectively depositing a load into or removing a load from the respective load storage means at each load handling position, power means for operating said load carrier, said flexible sensing means comprising elongated generally flexible elements mounted in generally taut condition on said load carrier and extending in said running clearance substantially the full height of said conveyor means, and said detecting means including control means coacting between said flexible elements and said power means for deenergizing the latter upon actuating engagement between at least one of said flexible elements and an improperly positioned load in said storage bay.

7. A warehousing system in accordance with claim 6 wherein said flexible elements are disposed in said running clearance forwardly and rearwardly of said elevator means.

8. A warehousing system in accordance with claim 6 including laterally spaced storage bays defining said travel zone therebetween, there being provided a plurality of said flexible elements on each side of said load carrier in the running clearance between said load carrier and each of said storage bays, and said flexible elements being disposed forwardly and rearwardly of said elevator means on the respective side of said load carrier.

9. A warehousing system in accordance with claim 5 including means resiliently anchoring an end of said flexible element to said load carrier.

10. A warehousing system in accordance with claim 5 wherein said flexible element comprises a generally nonresilient cable-like member mounted adjacent a side of the load carrier in said running clearance, said flexible element being operatively coupled to a rotatable pulley member mounted on said load carrier, an operating cam on said pulley member, said switch having a spring loaded actuator normally engaged with said cam for maintaining said switch in condition for energization of said power means, and means resiliently holding said pulley in position to cause engagement of said actuator by said cam, said pulley being adapted to be rotated upon engagement of said flexible element by an improperly positioned load in said storage bay to cause movement of said cam away from said actuator whereby said switch is tripped to cause deenergization of said power means and stopping of said load carrier.

11. A warehousing system in accordance with claim 5 including a rotatable member coupling said flexible element to said switch, abutment means on said rotatable member adapted for engagement with the actuator of said switch in one position of said rotatable member, said abutment means being adapted to trip said switch to cause deenergizing of said power means upon rotation of said rotatable member due to flexure of said flexible element.

12. A warehousing system in accordance with claim 3 including guide means mounted on said load carrier intermediate the upper and lower extremities thereof and coacting in guiding relation with said flexible sensing means.

13. A warehousing system in accordance with claim 11 wherein said rotatable member comprises a flanged pulley, one end of said flexible element being looped about said pulley and anchored thereto, a resilient detent on said pulley coacting between the latter and holding means on said load carrier to resist rotation of said pulley and maintin the latter in predetermined position, said abutment means normally engaging said actuator in said predetermined position of said pulley to hold said switch in non-tripped condition, said pulley upon rotation thereof due to flexure of said flexible sensing element causing said abutment means to move away from said actuator whereby said switch is automatically tripped to deenergize said power means.

14. A warehousing system in accordance with claim 1 wherein said flexible sensing means commencing at the upper end thereof diverges outwardly in a downward direction to a location intermediate the upper and lower extremities of said load carrier, guide means at said location coacting in engaged supporting relation with said flexible sensing means, said flexible sensing means converging inwardly in a downward direction from said guide means to be coupled to said load carrier adjacent the lower extremity of the latter.

15. A warehousing system in accordance with claim 14 wherein said guide means is of arcuate configuration in side elevation and engages said flexible sensing means in relative sliding relation.

16. In an automatic warehousing system comprising a plurality of load storage means disposed in a tiered arrangement in at least one storage bay, said system including a powered load carrier movable in a travel zone alongside said bay with there being a running clearance between said load carrier and said bay, the combination therewith of detecting means for sensing an improperly positioned load extending from said storage bay into said running clearance, said detecting means comprising elongated generally movable sensing means mounted on said load carrier and extending in said running clearance substantially the full height of said storage bay, said detecting means being operable to sense an improperly positioned load in said storage bay and to deenergize said load carrier to prevent its further movement, said load carrier comprising conveyor means movable generally horizontally in said travel zone along said bay, elevator means movable generally vertically on said conveyor means along said bay, and load supporting extractor means on said elevator means movable generally transversely of said travel zone across said running clearance for selectively depositing a load into or removing a load from the respective load storage means at each load handling position, power means for operating said load carrier, said sensing means comprising elongated generally flexible elements mounted in generally taut condition on said load carrier and extending in said running clearance substantially the full height of said conveyor means, and said detecting means including control means coacting between said flexible elements and said power means for deenergizing the latter upon actuating engagement between at least one of said flexible elements and an improperly positioned load in said storage bay, and including another detecting means mounted on said elevator means, said other detecting means comprising a feeler member for sweeping through said running clearance after the depositing in or removal of a load from a selected storage means in said storage bay by said extractor means, and other control means operatively coupled to said feeler member for deenergizing said power means upon engagement of said feeler member by an improperly positioned load.

17. A warehousing system in accordance with claim 16 wherein said other control means comprises a limit switch rotatably mounted to said elevator means for rotation in a generally vertical plane, means for rotating said switch, and said feeler member being operatively coupled to said switch for actuation thereof wherever said feeler member strikes a load projecting into said running clearance.

References Cited

UNITED STATES PATENTS

| | | | |
|---|---|---|---|
| 324,751 | 8/1885 | Curtiss | 187—41 |
| 367,450 | 8/1887 | Senior | 187—40 |
| 1,436,137 | 11/1922 | Aldred | 187—41 |
| 3,206,041 | 9/1965 | McGrath | 214—8.5 |
| 3,323,661 | 6/1967 | Closar | 214—16.4 |

ROBERT G. SHERIDAN, *Primary Examiner.*

R. B. JOHNSON, *Assistant Examiner.*